US006545740B2

(12) United States Patent
Werner

(10) Patent No.: US 6,545,740 B2
(45) Date of Patent: Apr. 8, 2003

(54) METHOD AND SYSTEM FOR REDUCING MOTION ARTIFACTS

(75) Inventor: William B. Werner, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 119 days.

(21) Appl. No.: 09/728,922

(22) Filed: Dec. 1, 2000

(65) Prior Publication Data

US 2002/0067464 A1 Jun. 6, 2002

Related U.S. Application Data

(60) Provisional application No. 60/171,718, filed on Dec. 22, 1999.

(51) Int. Cl.[7] .......................... G03B 19/18; H04N 5/14; G06T 13/00

(52) U.S. Cl. .......................... 352/50; 352/52; 348/700; 345/473; 345/475

(58) Field of Search .............................. 352/40, 44, 50, 352/52, 68, 84, 91 R; 348/169, 497, 699, 700, 910; 345/473, 606–610, 475

(56) References Cited

U.S. PATENT DOCUMENTS 4,952,051 A * 8/1990 Lovell et al. ............... 345/473
5,604,856 A * 2/1997 Guenter ...................... 345/473
6,008,865 A * 12/1999 Fogel ......................... 348/169
6,377,621 B2 * 4/2002 Borer ......................... 375/240

* cited by examiner

*Primary Examiner*—Rodney Fuller
(74) *Attorney, Agent, or Firm*—Charles A. Brill; Wade James Brady, III; Frederick J. Telecky, Jr.

(57) ABSTRACT

A motion artifact reduction system (10) includes a series of cinematic feature image frames ($IF_m$, $IF_{m+1}$)captured at an incoming frame rate. The motion artifact reduction system (10) also has a processor (12) operable to determine whether an object (O) having a first location ($O_m$) in a first image frame ($IF_m$) is sufficiently displaced from a location ($O_{m+1}$) in a second image frame ($IF_{m+1}$) corresponding to the first location ($O_m$). The processor (12) is also operable to interpolate data from the first image frame ($IF_m$) and the second image frame ($IF_{m+1}$) to create a third image frame ($OF_{n+1}$) including the interpolated data. The processor (12) is also operable to insert the third image frame ($OF_{n+1}$) between the first image frame ($IF_m$) and the second image frame ($IF_{m+1}$) to form a new series ($OF_n$, $OF_{n+1}$, and $OF_{n+2}$) in response to the determination that object (O) has been sufficiently displaced between image frames ($IF_m$, $IF_{m+1}$).

19 Claims, 2 Drawing Sheets

METHOD AND SYSTEM FOR REDUCING MOTION ARTIFACTS

This application claims priority under 35 USC §119(e)(1) of provisional application Ser. No. 60/171,718 filed Dec. 22, 1999.

TECHNICAL FIELD OF THE INVENTION

This invention relates to the field of cinema presentation and more particularly to a method and system for reducing motion artifacts.

BACKGROUND OF THE INVENTION

The appearance of moving images, such as those obtained by a panning camera in filming a video presentation or motion picture, may be undesirably blemished by motion artifacts. For example, motion pictures include a series of image frames that are typically shown to viewers at a frame rate of 24 frames per second (fps). The human eye can typically perceive undesirable temporal aliasing effects between image frames that contain objects that are moving rapidly across a field of view in the image plane.

Conventional approaches to this problem usually require a cinematographer to defocus or blur the image. This may reduce the juddered appearance of the object in motion. However, this blurring may undesirably limit the cinematographer's artistic autonomy in capturing the creative elements of the scene. Also, this blurring may not reduce the juddered appearance to sufficiently please the human eye.

In addition, conventional approaches do not resolve the persistence problems typically associated with human vision. For example, flicker effects perceived by the human eye worsen as the brightness of a motion picture is increased. In order to reduce or overcome these flicker effects, the cinematographer must reduce the brightness of particularly bright scenes or a scene viewed with a particularly high ambient light level. These constraints may also undesirably limit the cinematographer's artistic autonomy.

Other approaches have included increasing the temporal frame rate of the image capture process. However, this approach undesirably requires increased storage, distribution, and production resources that exceed those used in existing systems. Furthermore, this approach requires that existing equipment be modified to be effective. Therefore, it is desirable to diminish the flicker effects of frame objects.

SUMMARY OF THE INVENTION

From the foregoing, it may be appreciated that a need has arisen to eliminate undesirable temporal aliasing effects caused by objects moving rapidly across a field of view in the image plane. In accordance with the present invention, a motion artifact reduction system and method are provided that substantially eliminate or reduce disadvantages and problems of conventional systems.

According to one embodiment of the invention, there is provided a method and system for reducing motion artifacts having a series of cinematic feature image frames captured at an incoming frame rate. The motion artifact reduction system also has a processor operable to determine whether an object having a first location in a first image frame is sufficiently displaced from a location in a second image frame corresponding to the first location. The processor is also operable to interpolate data from the first image frame and the second image frame to create a third image frame including the interpolated data. The processor is also operable to insert the third image frame between the first image frame and the second image frame to form a new series in response to the determination that the object has been sufficiently displaced between image frames.

One technical advantage of the present invention is that it may be used in a variety of points along the authoring and presentation process. For example, the present invention may be used during the authoring process to correct imperfections. Yet another technical advantage of the present invention is that it may be used with other image enhancement processing such as noise reduction techniques.

Another technical advantage of the present invention is that it may reduce the production resources required to provide image artists additional enhancement controls in developing the content they desire. Yet another technical advantage of the present invention is that it may be used without modification to existing production and/or authoring equipment. Another technical advantage of the present invention is that it may be used in existing presentation systems with little or no modification. For example, the present invention may be used by a projector based on ancillary information that may be stored or distributed with the motion picture data. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE DRAWINGS

Figure 1:
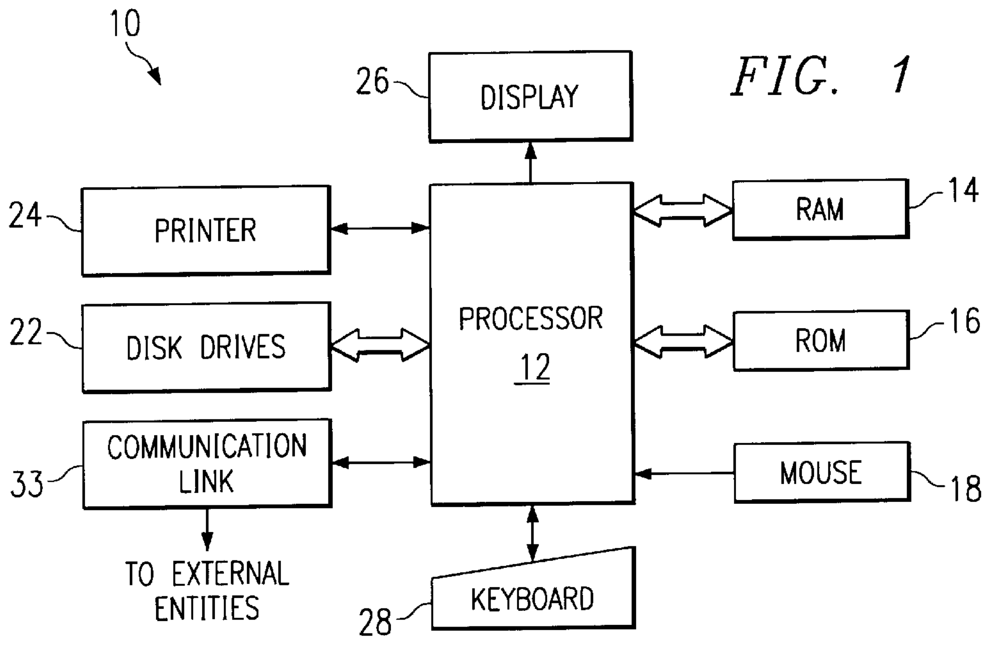
FIG. 1 illustrates a block diagram of a motion artifact reduction system.

FIG. 1 illustrates a system 10 that may be used for motion artifact reduction. Specifically, motion artifact reduction system 10 may comprise a portion of a cinema authoring processing system and may be used to execute applications having motion artifact reduction software. Motion artifact reduction system 10 may be adapted to execute any of the well known MS-DOS, PC-DOS, OS2, UNIX, MAC-OS and Windows operating systems or other operating system. Motion artifact reduction system 10 includes a processor 12, a random access memory (RAM) 14, a read only memory (ROM) 16, a mouse 18, a keyboard 28, and input/output devices such as a printer 24, disk drives 22, a display 26, and a communication link 33. The present invention includes programs that may be stored in RAM 14, ROM 16, or disk drives 22 and may be executed by processor 12. Disk drive 22 may include a variety of types of storage media such as, for example, floppy disk drives, hard disk drives, CD-ROM drives, digital audio tape (DAT) drives, or other storage media. Although this embodiment employs a plurality of disk drives 22, a single disk drive 22 could be used without departing from the scope of the invention. FIG. 1 only provides one example of a motion artifact reduction system

10. For example, motion artifact reduction system 10 may include other storage devices such as a Redundant Array of Independent Disks (RAID). Motion artifact reduction system 10 may also include a plurality of processors 12 and/or elements that may be used without conventional operating systems.

Data may be transferred between motion artifact reduction system 10 and one or more external entities such as service providers using a fiber optic, wireline, or wireless communication link 33. Communication link 33 may utilize any suitable network protocol and logical or functional configuration. For example, communication link 33 may be, but is not limited to, a computer network, a satellite link, a fiber optic communication link, a gateway, an antenna, a telephone line, any variant of digital subscriber lines (DSL, VDSL, etc.), or combination thereof, or any other type of communication link that can meet data throughput and other requirements as needed. In some applications, a cinematic feature may be communicated to a service provider for simultaneous or near simultaneous presentation of the cinematic feature.

In this embodiment, motion artifact reduction may be performed by software stored and executed by processor 12 with the results stored in any of the storage devices of motion artifact reduction system 10. Alternatively, software for motion artifact reduction may be stored in any of the storage media associated with motion artifact reduction system 10 and may be executed by processor 12 to reduce motion artifacts in cinematic data received by motion artifact reduction system 10. Motion artifact reduction may also be performed using special purpose digital circuitry contained either in motion artifact reduction system 10 or in a separate device. Such dedicated digital circuitry may include, for example, state machines, fuzzy logic, etc.

Figure 2:
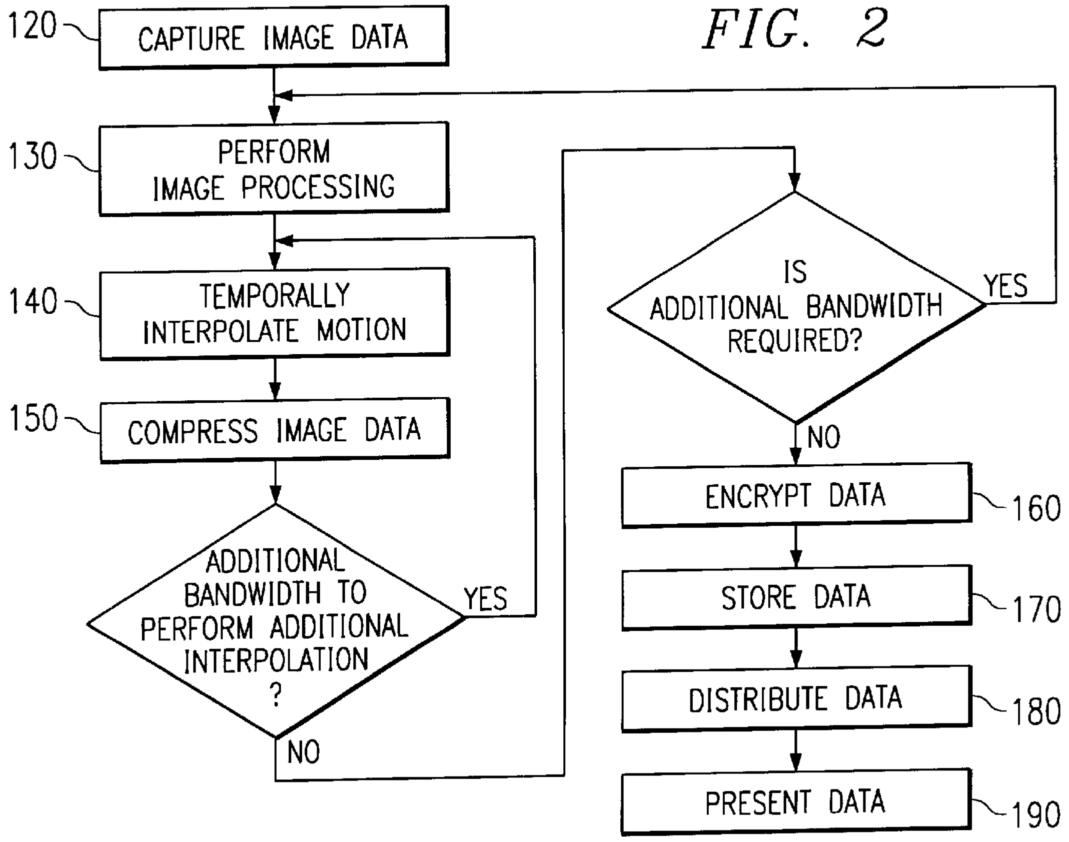
FIG. 2 illustrates an example of an authoring process that may be used to electronically process, distribute, and/or display cinematic data such as motion pictures.

FIG. 2 illustrates an example of an authoring process that may be used to electronically process, distribute, and/or display cinematic data such as film and motion pictures. The method includes the steps of capturing image data 120, performing image processing 130, temporal motion interpolation 140, compressing image data 150, encrypting data 160, storing data 170, distributing data 180, and presenting data 190. The method may include some or all of these steps, and may be performed using any other logical or functional order. Although the method includes each of the steps being performed individually, one or more of these steps may be performed together as a single step. Some or all of these steps may also be performed by software stored and executed by processor 12, or in a separate device, with the results stored in any of the storage devices of motion artifact reduction system 10 or in external devices.

The method begins at step 120, where a series of successive digital image frames may be captured by motion artifact reduction system 10 that, when presented, give the appearance to a viewer of motion between the images. For example, a cinematic feature such as a motion picture typically includes a plurality of image frames captured by one of a variety of known methods. In the motion picture industry, cameras typically capture image data as successive image frames on film. These image frames may be digitized from the film and stored for subsequent processing in any suitable storage media such as RAM 14, ROM 16, or disk drive 22. The image frames may be stored as digital image data using any suitable format. Image frames may also be captured by other methods that may need no digitization, such as by using digital cameras, computer generation, or where a series of image frames is received from one or more external sources. One typical structure for image frames is discussed in further detail in conjunction with FIG. 3.

In step 130, the image frames may be optionally processed. For example, it may be desirable in some applications to perform image enhancement processing, such as concealment of dirt, scratches, or other film defects. Alternatively or in addition, image frame-to-frame registration correction may be performed. Also alternatively or in addition, noise reduction techniques may be performed. In some applications, it may be desirable to perform noise reduction techniques prior to compression that remove or reduce unwanted data from the image frames. These noise reduction techniques may thus increase compression efficiency.

In step 140, data from two or more of the image frames may be temporally interpolated to produce at least one additional image frame. This additional image frame may be presented between the two image frames to improve the appearance of object motion between the image frames. That is, motion artifacts such as judder may be reduced or removed to or beyond the level of perception of human vision. In some applications, it may be desirable to perform this step prior to compressing some or all of the data within the image frames. For example, the number of additional images that are inserted in between the two image frames may affect the choice for a compression algorithm to be used, depending on the application. Temporal interpolation may be performed for each pair of image frames within the original cinematic feature.

Figure 3:
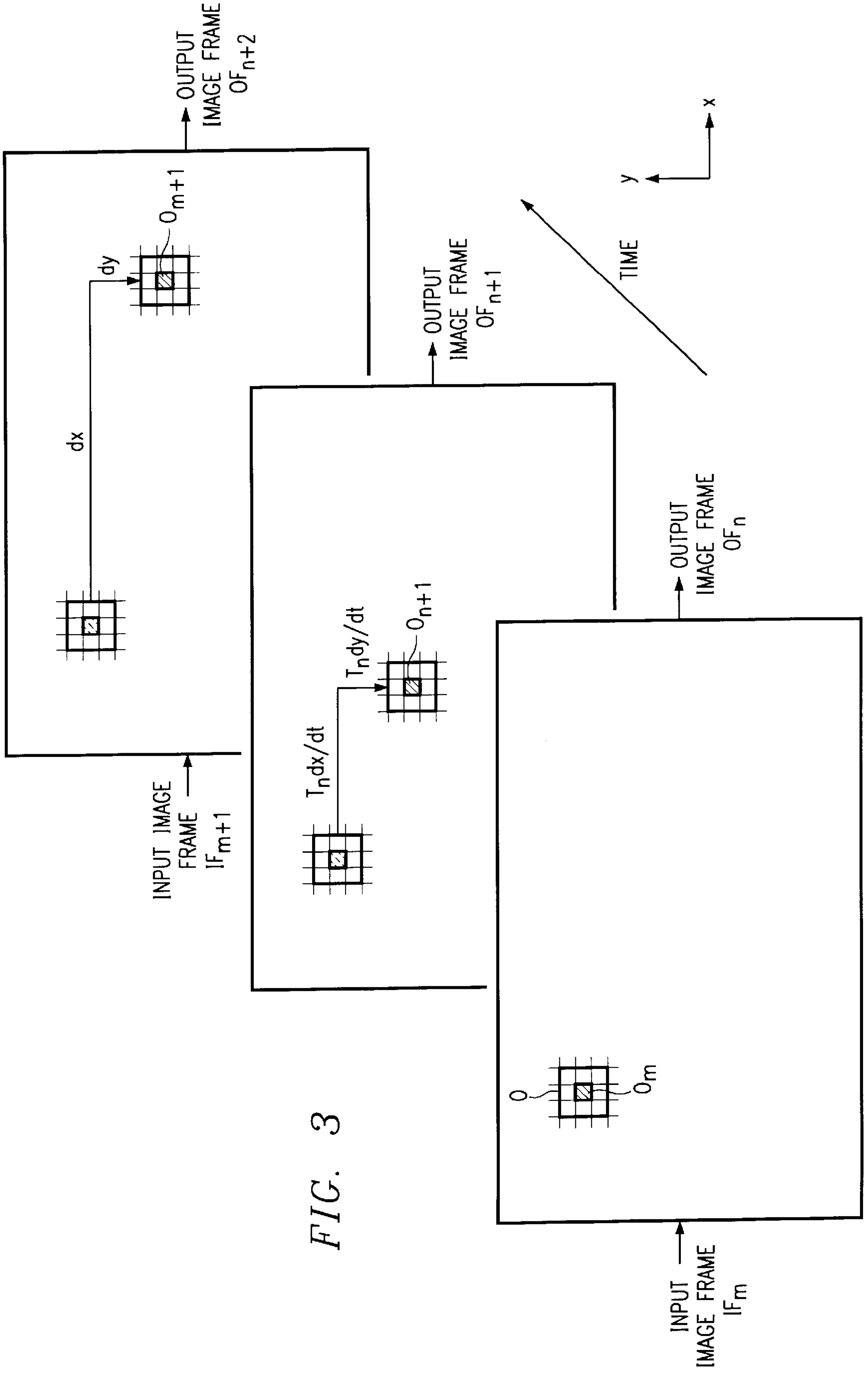
FIG. 3 illustrates an example of adding an additional image frame to cinematic data to reduce or eliminate motion artifacts.

On the other hand, it may be desirable to selectively perform temporal interpolation on all of the image frames, or on a selected portion thereof. For example, where there may be insufficient movement between two image frames, it may be desirable to not perform temporal interpolation between these image frames to reduce memory and/or display processing resources. Furthermore, where there is a great deal of movement between two image frames, a plurality of additional output image frames may be created to further reduce motion artifacts between these image frames. These steps may also be adaptively performed in various locations in the method. For example, where a display device includes sufficient memory and/or processing resources, any temporal interpolation that may be further desired may be performed in conjunction with display step 190. FIG. 3 illustrates one method for performing temporal interpolation.

In step 150, data within the image frames may optionally be compressed by using a variety of known compression techniques. Compressing the image data may desirably minimize the time and resources that may be necessary to store the image frames. Compressed image frames may also minimize distribution time and/or resource requirements. In step 152, a determination may be made as to whether additional bandwidth on communication link 33 may be available. Additional bandwidth may permit additional interpolated frames to be produced for insertion between two image frames in step 140, if desired. If additional bandwidth is not available, a determination may be made in step 154 as to whether additional bandwidth may be required for communication link 33. For example, the addition of interpolated frames typically increases the amount of total image data. This increase in total image data may be sufficient to overwhelm storage and/or distribution resources. In this scenario, the method may return to step 130 to perform additional processing such as further noise reduction that may permit higher compression, thus reducing the bandwidth. The method may then repeat steps 140 and 150 as desired.

In step 160, the data may optionally be encrypted using a variety of known methods. Encryption may be desirable in many applications. For example, where motion pictures are electronically distributed and/or stored, encryption may avoid piracy of the image data. Encryption authorization keys may also be used as identifiers to verify accounting and/or other contractual requirements, such as whether a service provider is presenting a motion picture on a certain date.

In step 170, the processed image frames may be stored as a final cinematic feature for subsequent distribution using a variety of suitable storage media discussed above. For example, the processed image frames may be stored on distributable magnetic media such as DAT and/or distributable optical media such as CD-ROM or Digital Video Disc-ROM (DVD-ROM). Alternatively or in addition, the processed image frames may be stored into the storage media of motion artifact reduction system 10 or in external devices.

In step 180, the final cinematic feature may optionally be distributed by using a variety of known methods. For example, the final cinematic feature may be sent over communication link 33 to external entities such as service providers or distributors such as a satellite distribution facility. Alternatively or in addition, the final cinematic feature may also be distributed to external entities on tangible magnetic media such as DAT and/or tangible optical media such as CD-ROM or DVD-ROM.

In step 190, the data may optionally be presented. It is contemplated that a final cinematic feature may be received from motion artifact reduction system 10 or an intermediate external entity, maintained, used, and/or presented by any one or a combination of service providers such as theater owners or operators, or any other entity or organization seeking to present cinematic features. A service provider may present the cinematic feature using a variety of projection methods. For example, the cinematic feature may be presented using an electronic display device, such as an electronic screen, or video monitor, such as a television or computer monitor. Electronic display devices also include, but are not limited to, electronic projectors that use a cathode ray tube to modulate light values or digital micro-mirror devices (DMDs).

Each of these display devices may be operable to read and/or process image frames within the cinematic feature using a variety of methods. Alternatively or in addition, these display devices may work in concert with a processor residing elsewhere, such as in a computer or data library, to read and/or process the cinematic feature data. These display devices may also be operable to decompress and/or decrypt data within the cinematic feature. Display of the cinematic feature is discussed in further detail in conjunction with FIG. 3.

FIG. 3 illustrates an example of adding an additional image frame to cinematic data to reduce or eliminate motion artifacts. In general, at least one additional output image frame is created by determining whether at least one defined object in an input image frame has moved sufficiently, interpolating the location of the image for the additional image frame, and inserting the object at its interpolated location into the additional output image frame.

Image frames typically include a number of pixels, each pixel usually including a plurality of bits of resolution. Each image frame includes a×b pixels, where a and b may be any suitable integers. For example, each input image frame may include 1024×1024 pixels, where a=b=1024. Typically, each of the input image frames are the same size, because the input image frames are often digitized film frames captured with a panning camera. Thus, a pixel location in one input image frame generally corresponds to the same pixel location in any other input image frame. Similarly, output image frames are typically the same size as input image frames. The invention also contemplates the use of varying image frame sizes, in which case corresponding locations for a pixel in, for example, input image frames $IF_m$ and $IF_{m+1}$, may be easily calculated by a number of known methods. Corresponding pixel locations between input image frames and any additional output image frames may also be easily calculated.

In the commercial motion picture industry, cinematic features are typically captured at 24 fps. A time interval between input image frames $IF_m$ and $IF_{m+1}$ as illustrated in FIG. 3 is typically=0.04167 seconds (1/24 fps). Other time intervals are also contemplated by the invention.

As illustrated in FIG. 3, input image frame $IF_m$ is an a×b pixel image frame, where a denotes a number of columns in the x direction, and b denotes a number of rows in the y direction. Input image frame $IF_m$ includes an object O that is a nine-pixel, square-shaped area, whose location in input image frame $IF_m$ may be designated by a variety of methods. In this embodiment, location of object O is designated by a shaded center pixel $O_m$. Similarly, input image frame $IF_{m+1}$ includes object O whose location in input image frame $IF_{m+1}$ is designated by shaded center pixel $O_{m+1}$. A location for object O may also be defined by, for example, a lower-left pixel (LLP), or a bounded region of pixels. One or more additional output image frames $OF_{n+1}$ may be created that include interpolated data from input image frames $IF_m$ and $IF_{m+1}$. These additional output image frames $OF_{n+1}$ may be inserted between input image frames $IF_m$ and $IF_{m+1}$ to produce three output image frames $OF_n$, $OF_{n+1}$, and $OF_{n+2}$. The output image frames $OF_n$, $OF_{n+1}$, and $OF_{n+2}$ may be stored for further processing as described in conjunction with FIG. 2 to produce a cinematic feature. Display of the output image frames $OF_n$, $OF_{n+1}$, and $OF_{n+2}$ may reduce the appearance of motion artifacts for one or more objects O.

FIG. 3 illustrates the displacement of object O from location $O_m$ in input image frame $IF_m$ to a location $O_{m+1}$ in input image frame $IF_{m+1}$ in the x and y directions. For example, between capture of input image frames $IF_m$ and $IF_{m+1}$, object O moved from $O_m$ to $O_{m+1}$ a distance dx and dy measurable in input image frame $IF_{m+1}$. Movement of an object O between input image frames $IF_m$ and $IF_{m+1}$ may be detected by pixel, object, region, etc. through a variety of known methods. For example, in some applications, Moving Picture Experts Group (MPEG) motion compensation vectors may be used to obtain rates of movement for object O dx/dt and dy/dt. Alternatively or in addition, subtraction techniques may be used to determine distances dx and dy by subtracting data values of input image frame $IF_m$ from input image frame $IF_{m+1}$, or vice versa, to determine movement for object O. In some applications, the position of object O with respect to output image frame $OF_{n+1}$ may also be predicted by using a second derivative or acceleration of object O as measured between input image frame $IF_{m+1}$ and one or more successor frames $IF_{m+2}$,$IF_{m+3}$, . . . , or predecessor frames $IF_{m-1}$,$IF_{m-2}$. The invention also contemplates detection of movement of an object O into, or out of, an input image frame. That is, object O need not be present in both input image frames $IF_m$ and $IF_{m+1}$. For example, where object O moves into image frame $IF_{m+1}$ but is not present in image frame $IF_m$, the position of object O with respect to output image frame $OF_{m+1}$ may be predicted by using a derivative dx/dt and/or dy/dt between one or more input image frames such as $IF_{m+1}$ and one or more successors $IF_{m+2}$, . . . . The position of object O may be similarly predicted in a forward direction by using one or more input image frames $IF_m$, $IF_{m-1}$, . . . .

Alternatively or in addition, it may be desirable to defocus and/or to blur data from input image frames $IF_m$ and $IF_{m+1}$ by, for example, passing the data through a temporal low pass filter at the Nyquist rate. This may be desirable where there is some residual motion between input image frames $IF_m$ and $IF_{m+1}$. It may also be desirable to determine the shape and/or the location of object O, such as where object O is a spinning top or an out-of-control car moving rapidly between input image frames $IF_m$ and $IF_{m+1}$.

Sufficient movement may be determined using a variety of static, dynamic or adaptive thresholds. For example, human vision may typically perceive movement at a 24 fps that occurs across one-twenty-fifth (1/25) of a frame. Thus, in some applications, it may be desirable to initially utilize this as a threshold for sufficient movement. In other applications, it may be desirable to use thresholds that are less than this distance, such as for higher luminance levels. Alternatively or in addition, the threshold may be adaptively changed due to resource or system design factors, such as bandwidth and/or processor limitations. For example, processing may be prioritized based on factors such as object type and/or movement that may be categorized within a range from most objectionable to least objectionable.

An interpolated position $O_{n+1}$ in output image frame $OF_{n+1}$ of object O may be determined by using its initial position in input image frame $IF_m$ $(x_m,y_m)$ at time $t_m$ and its position in input image frame $IF_{m+1}$ $(x_{m+1},y_{m+1})$ at time $t_{m+1}$. The interpolated position $O_{n+1}$ may also be designated as $(x_{n+1},y_{n+1})$. Additional interpolated positions $O_{n+1a,b, \ldots , n}$ in output image frame $OF_{n+1}$ of object O may also be determined as desired, by using data in input image frames $IF_m$ and $IF_{m+1}$, and/or data in output image frame $OF_{n+1}$. It may be desirable to interpolate positions for additional objects O if these additional objects O have sufficiently moved.

Output image frame $OF_{n+1}$ may then be created by a number of known methods. For example, object O may be inserted into output image frame $OF_{n+1}$ at location On. The pixel data representing object O may be inserted into output image frame $OF_{n+1}$. For example, object O may be represented by a bounded region of pixels derived from data in input image frames $IF_m$ and/or $IF_{m+1}$. Depending on the application, object O may be overlaid on top of a frame buffer.

The remainder of data within output image frame $OF_{n+1}$ outside this bounded region of pixels may be populated by data from input image frames $IF_m$, $IF_{m+1}$, or some combination of both. For example, this data may be an averaged result of the data from input image frames $IF_m$ and $IF_{m+1}$. In addition, data surrounding location $O_n$ may be populated by data from one input image frame on one or more sides of location $O_n$, and by data from the other input image frame on the other sides of location $O_n$. For example, as illustrated in FIG. 3, data to the right of location $O_n$ may be populated from input image frame $IF_m$, and data to the left of location $O_n$ may be populated from input image frame $IF_{m+1}$, or some combination of both. Alternatively or in addition, data from additional prior and/or successive input image frames (not explicitly shown) may be used to populate output image frame $OF_{n+1}$. This may enhance the appearance of continuity of movement between output image frames $OF_n$, $OF_{n+1}$, and $OF_{n+2}$ as they are displayed.

The series of output image frames $OF_n$, $OF_{n+1}$, and $OF_{n+2}$ may be further processed and then stored and/or distributed as a final cinematic feature for presentation, as previously discussed. In addition, the final cinematic feature may include a variety of control data that indicate suitable frame display rates as needed.

For example, the cinematic feature should typically be displayed with a frame rate that accommodates any of the additional output image frame $OF_{n+1}$ that have been inserted into the series. Alternatively, the time to display each output image frame may be decreased. This avoids a slow motion effect that otherwise would occur if the same frame rate is to be used. For example, where a single output image frame $OF_{n+1}$ is inserted between two output image frames $OF_n$ and $OF_{n+2}$, the incoming frame rate of 24 fps may be desirably doubled to 48 fps. Similarly, where two frames are inserted between two images, the frame display rate may be desirably tripled, and so on. If a cinematic feature includes image pairs with the same number of inserted output image frames between each pair, the entire feature may be displayed with a suitable frame rate. On the other hand, a single cinematic feature may include some image pairs with no output image frames inserted therebetween, and/or other image pairs with varying numbers of inserted output image frames. This feature may be displayed using suitably varied frame rates. In the case where interpolation between a plurality of input image frame pairs results in varying numbers of output image frames between the pairs, control data for the cinematic feature may appropriately identify the image frame pairs and a corresponding frame display rate.

The display devices desirably support the increased frame display rate. In addition, where a display device includes a processor with suitable functionality, it may adaptively change the frame display rate as desired, using the control data. Alternatively or in addition, the display device may also perform any of these interpolation functions as desired.

Thus, it is apparent that there has been provided in accordance with the present invention, a motion artifact reduction system and method that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A motion artifact reduction system, comprising:

a series of cinematic feature image frames captured at an incoming frame rate; and a processor determining whether an object at a first location in a first image frame is sufficiently displaced from said first location in a second succeeding image frame to require interpolation and, if interpolation is required, interpolating data from the first image frame and the second image frame to create a third image frame including the interpolated data and inserting the third image frame between the first image frame and the second image frame to form a new series in response to a determination that interpolation is required.

2. The system of claim 1, wherein the processor is operable to determine sufficient displacement and appropriately insert accordingly between all of the image frames in the series.

3. The system of claim 1, wherein an object is sufficiently displaced when it has moved across a humanly-discernable distance between the first image frame and the second image frame at the incoming frame rate.

4. The system of claim 1, wherein determining whether the object is sufficiently displaced includes using an adaptive threshold.

5. The system of claim 1, wherein the data is interpolated utilizing MPEG motion vectors.

6. The system of claim 1, further comprising a display device coupled to the processor and operable to present the cinematic feature at a frame display rate faster than the incoming frame rate.

7. The system of claim 1, wherein the processor is further operable to compress the new series and to determine sufficient displacement and insert another image frame accordingly between at least two of the image frames in the new series.

8. A cinematic feature with reduced artifacts, comprising:

a plurality of temporally positioned image frames captured at an incoming frame rate residing in a storage medium, a first of the plurality of the image frames including at least one object at a first location in the first of the plurality of the image frames, and a second of the plurality of the image frames including the at least one object at a second different location in the second of the plurality of the image frames; and at least one third image frame inserted temporally in between the first of the plurality of the image frames and the second of the plurality of the image frames to form the cinematic feature in response to a distance between the first location and the second location exceeding a threshold, the at least one third image frame including the at least one object at a third location representing an interpolated location between the first location and the second location;

further comprising a plurality of image frames inserted in between the first of the plurality of the image frames and the second of the plurality of the image frames to form the cinematic feature if the distance between the first location and the second location exceeds the threshold, the plurality of image frames each comprising the at least one object with a location representing an interpolated location between the first location and the second location.

9. The cinematic feature of claim 8, wherein the object comprises a plurality of pixels.

10. The cinematic feature of claim 8, wherein a frame display rate faster than the incoming frame rate is used to present the cinematic feature on a display device.

11. The cinematic feature of claim 8, wherein the threshold is a length of one-twenty-fifth of an image frame.

12. The cinematic feature of claim 8, wherein the interpolated location is derived utilizing MPEG motion vectors.

13. A method for reducing the appearance of artifacts, comprising the steps of:

providing a series of cinematic feature image frames captured at an incoming frame rate;

determining whether an object having a first location in a first image frame is displaced from a location in a succeeding second image frame corresponding to the first location by more than a predetermined minimum distance;

interpolating data from the first image frame and the second image frame to create a third image frame including the interpolated data; and inserting the third image frame between the first image frame and the second image frame to form a new series in response to a determination that the predetermined minimum distance has been exceeded.

14. The method of claim 13, further comprising:

repeating the steps of determining and inserting for all of the image frames in the series.

15. The method of claim 13, further comprising:

presenting the new series on a display device using a frame display rate faster than the incoming frame rate.

16. The method of claim 13, further comprising:

inserting a plurality of image frames between the first image frame and the second image frame to form a new series in response to the determination, each of the plurality of image frames comprising data interpolated from the first image frame and the second image frame.

17. The method of claim 13, further comprising:

processing data within one of the group consisting of the first image frame and the second image frame with a temporal low pass filter.

18. The method of claim 13, wherein sufficiently displaced is a distance discernable by human vision at the incoming frame rate.

19. The method of claim 13, wherein the step of determining is performed utilizing MPEG motion vectors.

* * * * *